United States Patent [19]
Siegel et al.

[11] Patent Number: 5,708,317
[45] Date of Patent: Jan. 13, 1998

[54] DC MOTOR DESIGNED FOR ASSET RECOVERY

[75] Inventors: Robert P. Siegel, Penfield; Walter Bujalski, Victor, both of N.Y.

[73] Assignee: Xerox Corporation, Stamford, Conn.

[21] Appl. No.: 620,818

[22] Filed: Mar. 25, 1996

[51] Int. Cl.$^6$ ............................ H02K 11/00; H01R 39/58
[52] U.S. Cl. .................... 310/248; 310/89; 310/238; 116/208
[58] Field of Search ................... 116/208; 310/238, 310/239, 242, 247, 248, 251, 89

[56] References Cited

U.S. PATENT DOCUMENTS

| | | | |
|---|---|---|---|
| 1,920,659 | 8/1933 | Naylon | 116/114 |
| 2,840,732 | 6/1958 | Nottelmann et al. | 310/239 |
| 3,484,939 | 12/1969 | Perry | 116/114 |
| 3,609,429 | 9/1971 | Thompson | 310/246 |
| 3,922,999 | 12/1975 | Meginnis | 116/114 |
| 4,333,095 | 6/1982 | Silva | 340/679 |
| 4,338,538 | 7/1982 | Major | 310/242 |
| 4,390,870 | 6/1983 | Michael | 340/648 |
| 4,528,557 | 7/1985 | Braun | 340/648 |
| 4,636,778 | 1/1987 | Corkran et al. | 340/648 |
| 4,918,348 | 4/1990 | Fitzsimmons et al. | 310/242 |
| 4,989,537 | 2/1991 | Hutchinson et al. | 116/208 |

FOREIGN PATENT DOCUMENTS

| | | | |
|---|---|---|---|
| 2538922 | 3/1977 | Germany | H01R 39/58 |
| 3031915 | 4/1982 | Germany | H01R 38/58 |
| 61-092135 | 5/1986 | Japan | H02K 11/00 |
| 6-141504 | 5/1994 | Japan | 310/89 |

Primary Examiner—Thomas M. Dougherty
Assistant Examiner—B. Mullins
Attorney, Agent, or Firm—John S. Wagley

[57] ABSTRACT

An electric motor including a housing defining an aperture therethrough is disclosed. The motor also includes an armature mounted in the housing and a brush mounted in the housing and slidably connected to the armature. The housing substantially encloses the armature and the brush. The aperture is positioned with respect to the brush so that the brush may be visible through the aperture and so that the remaining usable life of the brush may be visually determined while the electric motor is assembled.

30 Claims, 4 Drawing Sheets

DC MOTOR DESIGNED FOR ASSET RECOVERY

The present invention relates to an apparatus for electrical motors. More specifically, the invention relates to a brush wear indicator.

Many mechanical apparatuses utilize electrical motors to transmit torque. Many of these motors utilize a brush or brushes to transfer electricity from a stationary component or stator to a rotating element or armature. These brushes are in rubbing contact with the armature or split ring. This rubbing contact causes inherent wear of the brush. The life of the brush is typically the most common cause of failure and normal wear of the electric motor. Typically, as the brushes wear, the performance of the motor deteriorates to the point where it will not function properly. At this time, the defective motor is replaced with a new or rebuilt motor.

To reduce cost and to provide for recycling of scarce resources and reduction in environmental damage, many manufactured products are now being remanufactured. Electrical motors represent a portion of the machine to be remanufactured. It is important to determine whether the motors within the remanufactured machine need to be replaced or rebuilt or whether they can be used as is. Current, voltage, torque and speed may be measured in an operating motor to determine whether it is functioning properly. However, the motor may be functioning properly, yet lack the remaining life necessary for the requirements of the machine. Visual inspection of the motor is hampered by the fact that modern motors are totally enclosed and sealed to prevent the entry of contamination to the motor. One alternative to this problem is to replace the machine with all new or rebuilt motors. Another alternative is to disassembly every motor and inspect all the components for wear.

In order to remanufacture machinery and in particular to remanufacture electrophotographic copying and printing machines, many electrical motors would have to be either replaced or disassembly and inspected.

Attempts have been made to electrically monitor the wear of the brushes in electrical motors. These attempts have been limited to critical applications, for example, machinery required to support the life of a critically ill patient. Such wear indicating systems provide built-in electrical components within the motor which measure the length or corresponding life of the brush. These systems, while applicable for motors for life support equipment are very expensive and are not practical for non-critical environments, for example, most mechanical manufactured products, electrophotographic copying or printing machines.

The features of the present invention are useful in any industry where manufactured components, apparatuses or machines of are of sufficient size, complexity and cost to justify being remanufactured or rebuilt and which utilize brush type motors. One such is industry is the printing arts. For example electrophotographic printing machines are frequently remanufactured or rebuilt.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roller to the latent image. The resultant toner powder image is then transferred from the photoconductive surface to a copy sheet and permanently affixed thereto. The foregoing generally describes a typical mono-color single component development electrophotographic copying machine.

The following disclosures may be relevant to various aspects of the present invention:

U.S. Pat. No 4,918,348

Patentee: Fitzsimmons et al.

Issue Date: Apr. 17, 1990

U.S. Pat. No. 4,636,778

Patentee: Corkran et al.

Issue Date: Jan. 13, 1987

U.S. Pat. No. 4,4,528,557

Patentee: Braun

Issue Date: Jul. 9, 1985

U.S. Pat. No. 4,333,095

Patentee: Silva

Issue Date: Jun. 1, 1982

U.S. Pat. No. 4,390,870

Patentee: Michael

Issue Date: Jun. 28, 1983

U.S. Pat. No. 3,609,429

Patentee: Thompson

Issue Date: Sep. 28, 1971

U.S. Pat. No. 4,918,348 discloses an apparatus for detecting the war of a motor brush including a spring that biases the brush towards an extended position. A portion of the spring moves along a path towards the extended position as the brush wears. The spring portion makes a mechanical contact with a portion of an electric signal generating device that is disposed in the path to give an indication of the brush wear.

U.S. Pat. No. 4,636,778 discloses a brush wear monitoring system for dynamo electric machines. The system includes a sensor imbedded in a brush to provide a signal indicating a predetermined amount of brush wear. The brush wear signal is provided through an isolation network to an indicator circuit.

U.S. Pat. No. 4,528,557 discloses a motor brush wear indicator. The indicator includes a probe embedded in a brush and connected the primary circuit of a transformer for completing the secondary circuit when the brush has worn to a predetermined degree. An oscillator is coupled to the secondary of the transformed which in turn is connected to the gate of an SCR for providing a gate signal when the primary circuit is completed.

U.S. Pat. No. 4,333,095 discloses an indicator for an electric motor which gives an indication when a brush has worn to the point where it should be replaced. An alarm sounds or a light is illuminated when the brush is so worn. The brush wear indicator includes an indicator contact which is electrically connected to the indicator means and is insulated from but mounted to move in accordance with the brush wear movement.

U.S. Pat. No. 4,390,870 discloses an interface circuit for use between a plurality of brush wear detecting sensors. The interface circuit is operable to transmit a signal form any of the sensors to actuate the alarm and latch it in its operative state until the alarm is de-energized by an operator.

U.S. Pat. No. 3,609,429 discloses a brush wear indicator for an electric motor. The indicator includes a switch which is held in an open or closed state by a pin contacting and biased against a side of a motor brush. The switch trips to indicate a warning device whenever the brush is nearly worn out and lets a pin drop over an edge of the brush.

In accordance with one aspect of the present invention, there is provided an electric motor including a housing defining an aperture therethrough. The motor also includes an armature mounted in the housing and a brush mounted in the housing and slidably connected to the armature. The housing substantially encloses the armature and the brush. The aperture is positioned with respect to the brush so that the brush may be visible through the aperture and so that the remaining usable life of the brush may be visually determined while the electric motor is assembled.

In accordance with another aspect of the present invention, there is provided an electrophotographic printing machine of the type having an electric motor to rotate mechanical components. The electric motor includes a housing defining an aperture therethrough. The motor also includes an armature mounted in the housing and a brush mounted in the housing and slidably connected to the armature. The housing substantially encloses the armature and the brush. The aperture is positioned with respect to the brush so that the brush may be visible through the aperture and so that the remaining usable life of the brush may be visually determined while the electric motor is assembled In accordance with a further aspect of the present invention, there is provided a method of determining the remaining useful life of an electric motor. The method includes the steps of placing a visual indicator on an electric motor brush and forming an opening in an electric motor housing. The method also includes the steps of viewing the visual indicator through the opening and calculating the remaining useful life of the electric motor based on the visual indicator.

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 4:
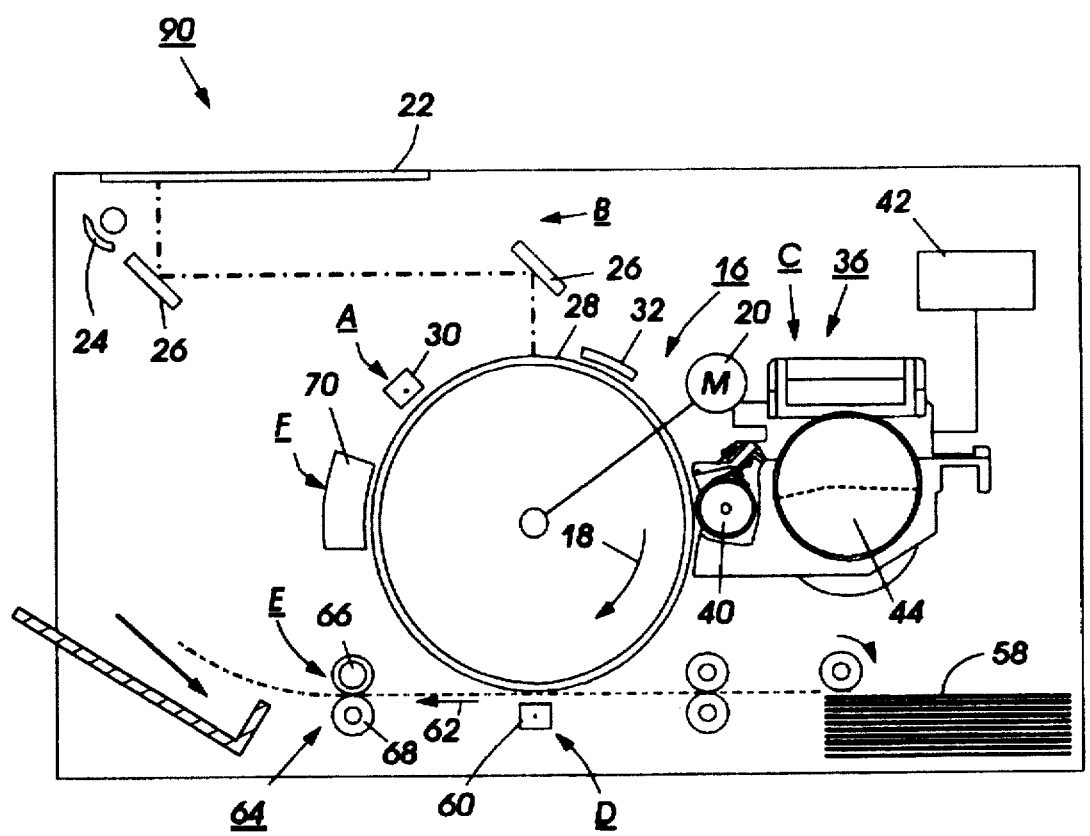
FIG. 4 is a schematic elevational view of an electrophotographic printing machine incorporating the FIG. 1 motor therein.

For a general understanding of the illustrative electrophotographic printing machine incorporating the features of the present invention therein, reference is made to the drawings. In the drawings, like reference numerals have been used throughout to designate identical elements. FIG. 4 schematically depicts the various components of an electrophotographic printing machine incorporating the brush wear viewing feature of the present invention therein. Although the brush wear viewing feature of the present invention is particularly well adapted for use in the illustrative printing machine, it will become evident that the brush wear viewing feature is equally well suited for use in a wide variety of printing machines and are not necessarily limited in its application to the particular embodiment shown herein.

Referring now to FIG. 4, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document to be reproduced is placed on a platen 22, located at imaging station B, where it is illuminated in known manner by a light source such as a tungsten halogen lamp 24. The document thus exposed is imaged onto the drum 16 by a system of mirrors 20, as shown. The optical image selectively discharges the surface 28 of the drum 16 in an image configuration whereby an electrostatic latent image 32 of the original document is recorded on the drum 16 at the imaging station B.

At development station C, a magnetic development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the magnetic roll 40.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device (not shown) to enable removal therefrom. These particles are removed at cleaning station F. The vacuum assisted, electrostatic, brush cleaner unit 70 is disposed at the cleaner station F. The cleaner unit has two brush rolls that rotate at relatively high speeds which creates mechanical forces that tend to sweep the residual toner particles into an air stream (provided by a vacuum source), and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

Figure 1:
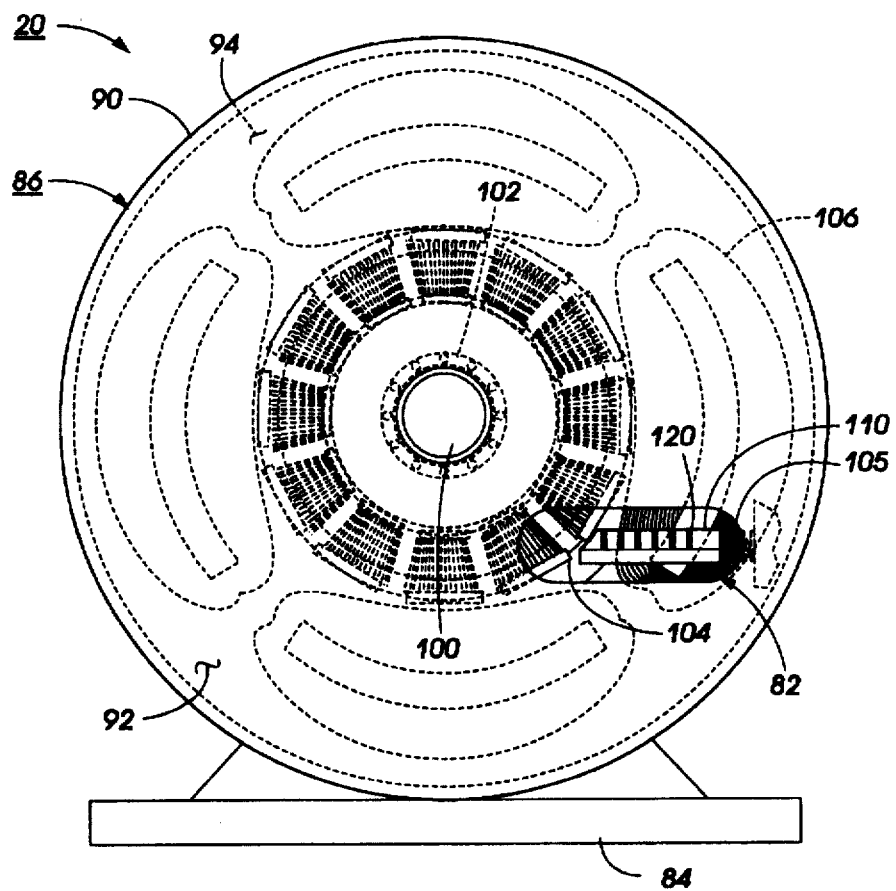
FIG. 1 is a plan view of an electrical motor including the brush wear viewing feature of the present invention.

According to the present invention and referring to FIG. 1, a motor 20 employing the brush wear viewing feature 82 of the subject invention is shown. The motor 20 is enclosed, preventing the viewing of the brush 110 without the use of the brush wear viewing feature 82.

It should be appreciated that the present invention may be practiced on any electrical motor 20 having a brush or brushes that transfer electricity from a fixed component or stator to a rotating component or armature. For example, the motor 20, except as modified as will be described later, may be a standard, commercially available electrical motor with at least one brush and may, for example, be a DC (direct current) brush motor. The motor 20 may have suitable mounting arrangement such as face mounting, or may, as shown in FIG. 1, include a base 84 on which housing 86 is supported. The housing 86 includes a generally, cylindrically shaped peripheral portion 90 to which first end portion 92 and second end portion 94 are attached. The peripheral portion 90 is also secured to base 84. It should be appreciated that the motor could also be mounted by other means such as by end caps. The peripheral portion, first end portion 92, and second end portion 94 are made of any suitable durable material, for example, stamped steel. The base 84 is made of any suitable durable material, for example, cast iron or stamped steel. The peripheral portion 90 is secured to the base 84 by any suitable method, for example, by fasteners or by welding. The first end portion 92 is secured to the peripheral portion 90 by any suitable method, for example, by fasteners or by welding. The second end portion 94 is secured to the peripheral portion by any suitable method, for example, by fasteners or by welding. Preferably, at least the first end portions 92 or the second end portion 94 are removably secured to the peripheral portion in order that the internal workings of the motor 20 may be installed and disassembled for service.

Centrally located within the motor 20 and concentric with longitudinal axis 96 is shaft 100. Shaft 100 extends beyond at least second end portion 94. Further mechanical components are attached to shaft 100, for example, pulleys or gears (not shown). The shaft 100 is secured to the motor 20 by bearings 102 mounted in the first end portion 92 and the second end portion 94. An armature 104 is secured to shaft 100 and rotates therewith. Stator windings 106 are secured to the peripheral portion 90 of the motor 20 and remain stationary with the cylindrically shaped peripheral portion 90 of the motor 20.

At least one brush 110 is used to interconnect the stator winding 106 with the armature 104. Typically, the motor 20 includes more than one brush 110. The brush 110 may be made of any suitable, durable electrically conductive material. For small to medium size brush type DC motors, conductive carbon brushes have been found to be satisfactory.

As shown in FIG. 1, the brush wear viewing feature 82 is in the form of an aperture 82 formed in first end portion 92 of the motor 20. The aperture 82 forms a viewing window for the brush 110. The aperture 82 may be located anywhere about either the first end portion 92, the second end portion 94, or the peripheral portion 90 of the motor 20. Preferably, however, the aperture 82 is positioned as close as possible to the brush 110 and is so located that the brush 110 may be viewed when looking at an attitude normal to the surface of the motor 20. For example, as shown in FIG. 1, for brush 110 located near first end portion 92 of the motor 20, the aperture 82 is formed from first end portion 92. The brush 110 may thus be viewed through aperture 82 when viewing in the direction parallel to axis 96. The aperture 82 may have any suitable size and shape necessary to view the brush 110, but preferably has a shape similar to that of the brush 110, for example, an elongated slot as shown in FIG. 1.

Figure 1A:
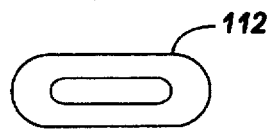
FIG. 1A is a plan view of a plug for the brush wear viewing feature of the present invention.

To prevent contamination to the internal workings of the motor 20, preferably, the aperture 82 is protected by a removable cover 112, in the form of a plug as shown in FIG. 1A. The plug 112 has a shape conformable to the aperture 82 and is made of a conformable material, e.g., a synthetic rubber.

Figure 1B:
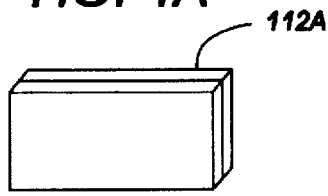
FIG. 1B is a plan view of a label for the brush wear viewing feature of the present invention.

Alternatively, the cover may be in the form of label 112a as shown in FIG. 1B. The label 112a may include an adhesive back for securing the label 112a to the peripheral portion 90 of the motor 20.

Figure 1C:
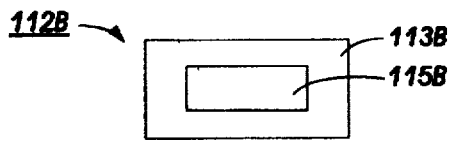
FIG. 1C is a plan view of a transparent cover for the brush wear viewing feature of the present invention.

The cover may also be in the form of a transparent cover 112b as shown in FIG. 1C. The transparent cover 112b may include a transparent central portion 115b as well as an attaching area 113b for attaching the cover 112b to the peripheral portion 90 of the motor 20 the attaching area 113b may be in the form of label or a plug or include tabs or detents (not shown).

The condition of the brush 110 may be observed through aperture 82 by removing the cover 112 or the label 112a. After inspection, the cover 112 or the label 112a may be reinstalled into the aperture 82 to prevent contamination from entering the motor 20.

Figure 2:
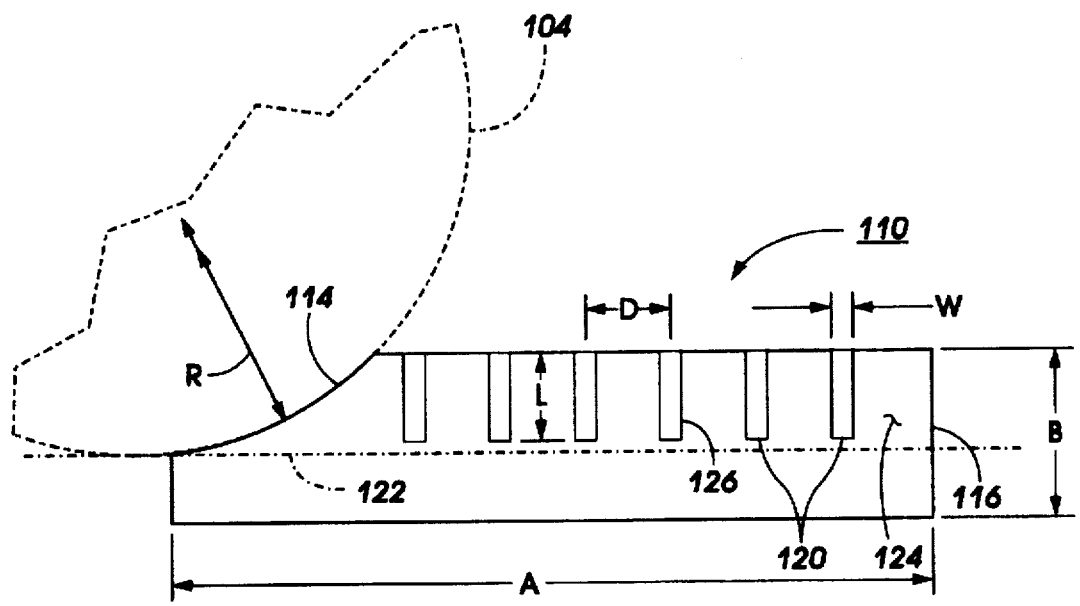
FIG. 2 is an enlarged view of a brush of the FIG. 1 electrical motor.

The brush 110 is shown in greater detail in FIG. 2. The brush 110 may have any suitable durable shape, but preferably has a rectangular configuration. The brush 110 includes contact zone 114 which is in contact with the armature 104 (see FIG. 1). Referring again to FIG. 2, the wearing of the brush 110 against the armature causes contact zone 114 to be described by radius R roughly equal to the radius of the armature. The brush 110, when in the form of a somewhat unpliable form, for example, when in the form of a carbon brush, is urged toward armature 104 by an loading means, for example a leaf or coil spring 105, loading the brush 110 toward the armature. As the brush 110 wears during the life of the motor 20, the contact zone 114 moves steadily toward the mounting face. 116 of the brush 110 opposed to the contact zone 114.

While the invention may be practiced by merely viewing the brush 110 through the viewing window 82, preferably, the brush includes visual indicators 120. The visual indicators 120 may be in any suitable form, for example, protrusions, notches, voids, or any other suitable visual feature on the brush 110. Preferably, however, in order to minimize cost and maintain uniform conductivity of the brush 110, the visual indicators are in the form of marks.

The invention may be practiced with a single mark positioned at the location of minimum brush length to permit the reuse of the motor in a rebuilt machine or may include a multitude of marks 120, as shown in FIG. 2, whereby the marks may indicate various conditions of the motor from an almost like new condition to a marginally operating position.

The marks 120 may be applied to the brush in any suitable manner, for example, by etching or engraving the marks onto the brush. The marks 120 are preferably positioned somewhat tangential to the contact zone 114 or the wearing surface of the brush 110. For example, as shown in FIG. 2, the marks 120 are positioned perpendicular to longitudinal axis 122 of the brush 110. The marks 120 may extend any particular length as long as the length is long enough to be visually observable through the viewing window. For example, for a brush having a length A of approximately 0.50" and a thickness B of approximately 0.10", the marks have a length L of approximately 0.06" and a width W of approximately 0.25". The marks are preferably parallel to each other and spaced apart a distance D of approximately 0.07". Preferably, as shown in FIG. 2, the marks 120 are formed by applying a coating 124 to at least a portion of the brush 110 which will be worn by the armature 104. The use of a coating 124 of, for example, white paint, is particularly important when using a carbon brush which is typically black. The marks 120 are formed over the white coating 124 leaving the marks 120, the color of the brush 110 which is typically black. Each of the marks 120 represent the position when contacting the armature represent a certain remaining life on the motor. For example, in FIG. 2, third mark from the left 126, may represent the minimum brush length to provide for a motor life suitable for a rebuilt machine.

Figure 2A:
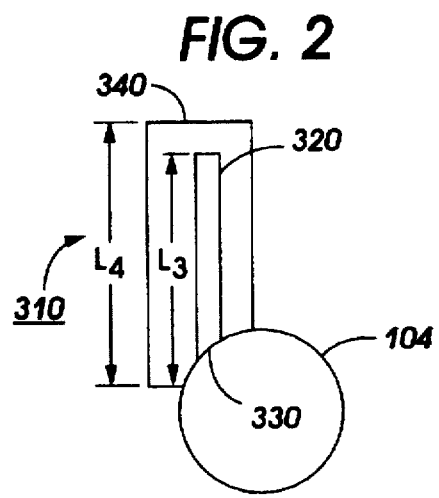
FIG. 2A is an enlarged view of a brush of an alternate embodiment of the brush wear viewing feature of the present invention utilizing an axial stripe.

Referring now to FIG. 2A, an alternate configuration of the brush is shown as brush 310. Brush 310 is similar in size and shape and materials as brush 110. Brush 310 includes an axial stripe 320 made of a coating, for example white paint. The stripe 320 extends for a length L3 from the contract zone 330 of the brush 310 to a point spaced from opposed end 340 of the brush 310. Length L3 is less than the entire length L4 of the brush 310. The distance L4–L3 represents the minimum allowable length of the brush 310 for an acceptable reusable motor brush 310.

Figure 2B:
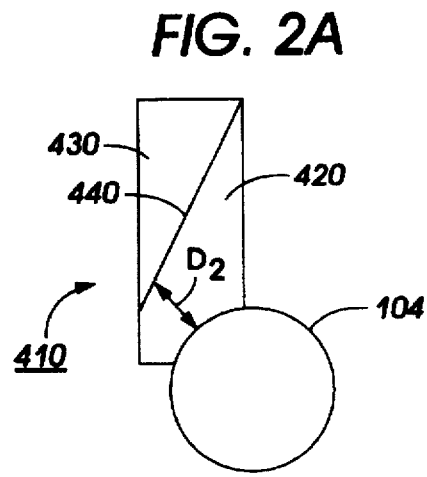
FIG. 2B is an enlarged view of a brush an alternate embodiment of the brush wear viewing feature of the present invention utilizing a diagonal strip.

Referring now to FIG. 2B, another alternate configuration of the brush is shown as brush 410. Brush 410 is similar in size and shape and materials as brush 110. Brush 410 includes an diagonal strip 420 made of a coating, for example white paint. The strip 420 extends diagonally across a face 430 of the brush 410. Distance D2 from the commutator 104 to the edge 440 between the strip 420 and the remainder of face 430 is an indication of remaining life of the brush 410. For example D2 may need to be at least 0.10 inches.

Figure 3:
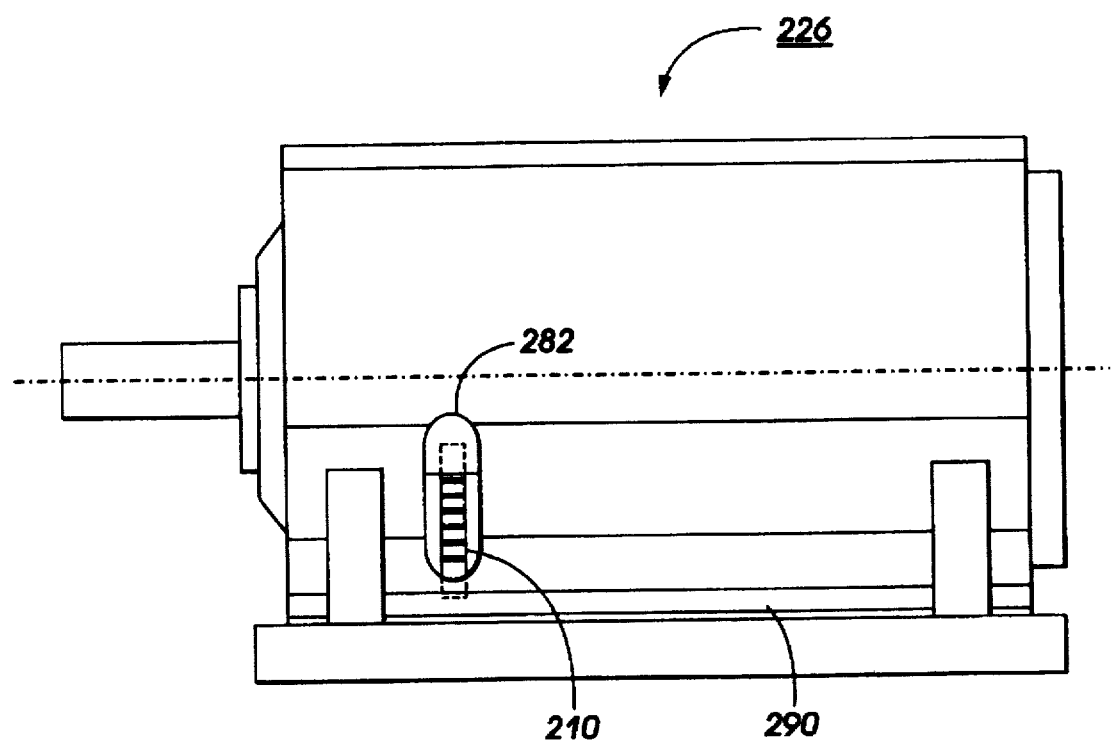
FIG. 3 is a plan view of an alternate embodiment of an electrical motor including the brush wear viewing feature of the present invention.

Referring now to FIG. 3, motor 226 is shown. Motor 226 is similar to motor 20, except that viewing feature 282 in the form of viewing window 282 is positioned on peripheral portion 290 of the motor 226. Brush 210 is urged upwardly by spring 205. Viewing of brush 210 is accomplished through the viewing window 282 in the peripheral portion 290.

By providing an electrical motor with a viewing window through which the condition of the brush may be viewed, a motor may be inspected while assembled and the remaining life of the motor can be determined. The remaining life determined from the condition of the brush will permit the reuse of motors in good condition and with sufficient remaining life without disassembling the motors and thus save labor and expense.

By providing a motor with a viewing window to view the condition of the brushes of the motor xerographic copy machines may be remanufactured utilizing the existing motor from the used machine without the requirement of replacing the motors or rebuilding the motors.

By providing a motor with a viewing window and a brush with visual marks indicating the amount of remaining life of the brush, the condition and remaining life of the brush may be readily observed without disassembling the motor.

By providing an electrical motor with a viewing window and a brush with visual marks indicating the amount of remaining life on the brush, a xerographic copy machine may be remanufactured utilizing existing motors without the requirement of replacing the motors or rebuilding the motors.

When a xerographic copy machine is returned from service to be remanufactured, the motor may be removed from the existing used machine. The plug is then removed from the viewing window and the inspector at the remanufacturing site views through the viewing window the condition of the brush. The number of marks remaining on the brush are then counted by the inspector and compared to a remanufacturing specification as to whether a sufficient quantity of the marks remain. For example, if three marks are required on the machine and say, for example, four are remaining, the motor may be reassembled into a remanufactured machine without the motor being disassembled and rebuilt or scrapped and replaced with a new motor.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An electric motor, comprising:

a housing defining an aperture therethrough;

an armature mounted in said housing; and a brush, mounted in said housing and having an end slidably connected to said armature in contact zone said housing substantially enclosing said armature and said brush, the aperture being positioned with respect to the brush so that at least a portion of the end of the brush may be visible through the aperture, whereby remaining usable life of said brush may be directly visually observed while the electric motor is assembled.

2. An electric motor according to claim 1, wherein said brush comprises a visual indicator thereon representative of the remaining usable life of said brush.

3. An electric motor according to claim 2, wherein said visual indicator comprise marks, at least one of said marks so positioned with respect to said brush so as to represent a minimum length of said brush for use in a rebuilt machine.

4. An electric motor according to claim 3, wherein said marks comprise spaced apart parallel lines, said lines being perpendicular to the longitudinal axis of said brush.

5. An electric motor according to claim 3, wherein said marks are etched.

6. An electric motor according to claim 3, wherein said marks are engraved.

7. An electric motor according to claim 2, wherein:

said brush further comprises a coating thereon; and said visual indicator comprise a mark on said coating.

8. An electric motor according to claim 2, further comprising a cover secured to said housing and at least partially covering the aperture.

9. An electric motor according to claim 8, wherein said cover comprises a plug.

10. An electric motor according to claim 8, wherein said cover comprises a label.

11. An electric motor according to claim 8, wherein at least a portion of said cover is transparent.

12. An electric motor according to claim 2, wherein said housing comprises:

a peripheral portion extending radially beyond said armature;

a first end portion secured to said peripheral portion; and a second end portion spaced from said first end portion.

13. An electric motor according to claim 12, wherein the aperture is located in the peripheral portion of said housing.

14. An electric motor according to claim 12, wherein the aperture is located in at least one of said first end portion and said second end portion of said housing.

15. An electrophotographic printing machine of the type having an electric motor to rotate mechanical components, comprising:

a housing defining an aperture therethrough;

an armature mounted in said housing; and a brush, mounted in said housing and having an end slidably connected to said armature in a contact zone, said housing substantially enclosing said armature and said brush, the aperture being positioned with respect to the brush so that at least a portion of the end of the brush may be visible through the aperture, whereby remaining usable life of said brush may be directly visually observed while the electric motor is assembled.

16. A printing machine according to claim 15, wherein said brush comprises a visual indicator thereon representative of the remaining usable life of said brush.

17. A printing machine according to claim 16, wherein said visual indicator comprise marks, at least one of said marks so positioned with respect to said brush so as to represent a minimum length of said brush for use in a rebuilt machine.

18. A printing machine according to claim 17, wherein said marks comprise spaced apart parallel lines, said lines being perpendicular to the longitudinal axis of said brush.

19. A printing machine according to claim 17, wherein said marks are etched.

20. A printing machine according to claim 17, wherein said marks are engraved.

21. A printing machine according to claim 16, wherein:

said brush further comprises a coating thereon; and said visual indicator comprise a mark on said coating.

22. A printing machine according to claim 16, further comprising a cover secured to said housing and at least partially covering the aperture.

23. A printing machine according to claim 22, wherein said cover comprises a plug.

24. A printing machine according to claim 22, wherein said cover comprises a label.

25. A printing machine according to claim 22, wherein at least a portion of said cover is transparent.

26. An printing machine according to claim 15, wherein said housing comprises:

A peripheral portion extending radially beyond said armature; and a first end portion secured to said peripheral portion; and a second end portion spaced from said first end portion.

27. A printing machine according to claim 26, wherein the aperture is located in the peripheral portion of said housing.

28. A printing machine according to claim 26, wherein the aperture is located in at least one of said first end portion and said second end portion of said housing.

29. A method of determining the suitability of an electric motor used in a new machine for use in a rebuilt machine, comprising the steps of:

placing a visual indicator which represents the minimum length of the brush for a motor suitable for use in a rebuilt machine on an electric motor brush;

forming an opening in an electric motor housing;

utilizing the motor in a new machine;

viewing the brush through the opening; and observing whether the visual indicator remains on the electric motor.

30. An electric motor for use in a machine and for possible, further, later use in a rebuilt machine, comprising:

a housing defining an aperture therethrough;

an armature mounted in said housing;

a brush, mounted in said housing and slidably connected to said armature, said housing substantially enclosing said armature and said brush; and a visual indicator co-operable with said brush for indicating the minimum length of the brush for use in the rebuilt machine, whereby the suitability of reusing the motor in the rebuilt machine may be visually observed while the electric motor is assembled.

* * * * *